Figure 1:
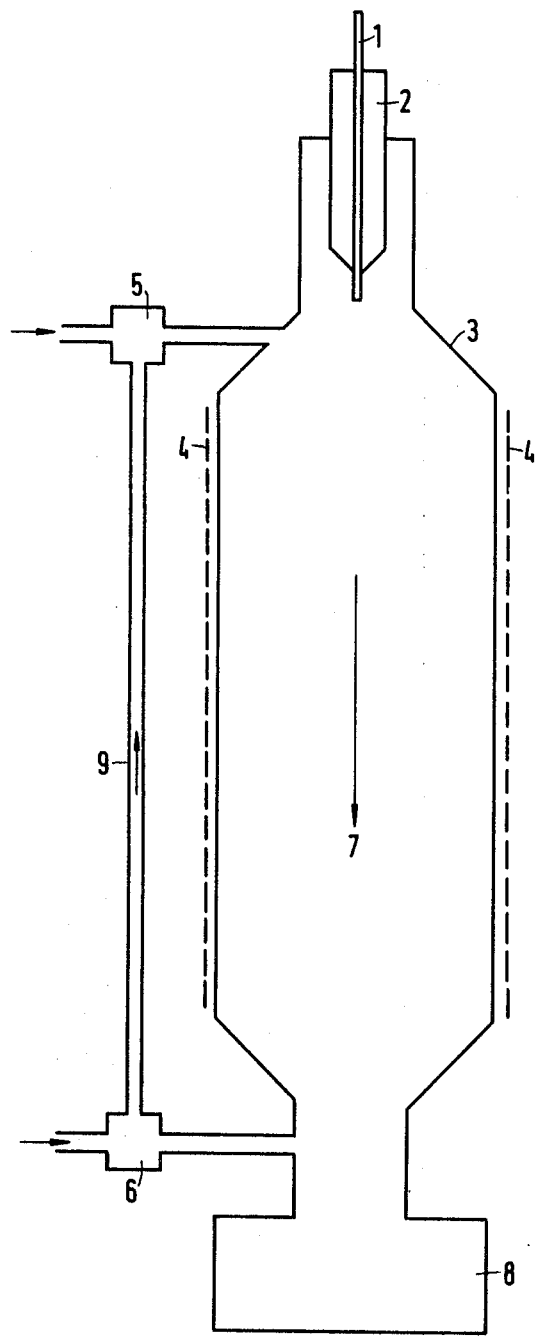

United States Patent

[11] 3,607,067

[72] Inventor Julius Nickl
 Neukeferloh near Munich, Germany
[21] Appl. No. 9,114
[22] Filed Feb. 9, 1970
[45] Patented Sept. 21, 1971
[73] Assignee Siemens Aktiengesellschaft
 Continuation of application Ser. No.
 548,014, May 5, 1966, now abandoned.

[54] METHOD OF PRODUCING FILAMENTARY MONOCRYSTALS
 6 Claims, 2 Drawing Figs.
[52] U.S. Cl. .................................................. 23/223.5,
 23/1, 23/183, 23/209, 148/1.6, 106/55
[51] Int. Cl. .................................................. C01b 33/02
[50] Field of Search .................................. 23/1, 138,
 139, 183, 140, 147, 148, 209, 223.5; 148/1.6

[56] References Cited
 UNITED STATES PATENTS
| 2,904,404 | 9/1959 | Ellis, Jr. | 23/223.5 |
| 3,125,416 | 3/1964 | Ryshkewitch et al. | 23/183 |
| 3,129,059 | 4/1964 | Enk et al. | 23/1 X |
| 3,210,149 | 10/1965 | Eland | 23/1 |
| 3,233,111 | 2/1966 | Pike | 23/223.5 |
| 3,275,412 | 9/1966 | Skrivan | 23/140 |
| 3,291,565 | 12/1966 | Taebel et al. | 23/183 |
| 3,332,870 | 7/1967 | Orbach et al. | 23/1 X |
| 3,341,360 | 9/1967 | Nickl | 23/223.5 X |
| 3,365,316 | 1/1968 | Kingery et al. | 23/183 X |
| 3,418,076 | 12/1968 | Campbell | 23/1 X |

Primary Examiner—Edward Stern
Attorney—Curt M. Avery

ABSTRACT: Described is an improvement in the method of producing filamentary monocrystals by precipitation of crystal substance from a vaporous compound in a reaction vessel at elevated temperature, which comprises supplying the reaction space in the vessel with a mist of droplets formed of seed material for the monocrystals to be produced, said droplet material having a melting point 50° to 500° C. below that of the monocrystals to be produced; maintaining said reaction space at a temperature between the respective melting points of said droplet material and said monocrystals; and contacting the vaporous compound in said reaction space with said mist of droplets, whereby filamentary monocrystals grow onto the droplets. Also described is apparatus for performing the method.

PATENTED SEP 21 1971 3,607,067

METHOD OF PRODUCING FILAMENTARY MONOCRYSTALS

This is a continuation of application Ser. No. 548,014, filed May 5, 1966, now abandoned.

This invention relates to a method of producing filamentary monocrystals such as those commonly designated as "whiskers." On account of their extreme, nearly theoretical mechanical strength ($kg/mm^2$), which may exceed by a multiple that of strongest structural steel, such whiskers are expected to afford a significant improvement of work materials analogous to the reinforcement of synthetic plastics by embedment of glass fibers.

Several methods are known for producing whiskers from many different materials. Reference in this respect may be had, for example, to the books by Doremus, Roberts and Turnbull: "Growth and Perfection of Crystals" (Wiley and Son, 1958, pages 44–54), and Wilke: "Methoden der Kristallzuchtung" (1963, pages 436–438, 455–460). It is known from these books that whiskers can be made by dissociation of a vapor with the aid of a chemical reaction. The known methods of producing whiskers, however, furnish only individual specimens, so that it has been infeasible to industrially utilize the theoretically valuable properties of whiskers on a commercial scale.

It is an object of my invention to devise a method which affords a continuous production of whiskers and which lends itself for economical use in industry.

To this end, the invention is predicated upon the production of filamentary monocrystals by thermal or chemical dissociation of a vaporous chemical compound of the whisker substance or of a component thereof. The chemical compound preferably forms part of a reaction gas mixture and is subjected to the dissociating reaction in a reaction vessel at elevated temperature. According to my invention I supply the reaction vessel not only with the vaporous reaction gas to be dissociated but also with a supply of crystal-seed substance. Preferably, the seed substance is identical with the compound to be dissociated but is given an addition of impurities in such a quantity as to reduce the melting point 50 to 500° C. below that of the pure substance. I further heat the reaction space proper of the vessel to a temperature between the melting point of the impurity-containing substance and the melting point of the pure substance, convert the impurity-containing substance to a mist of molten droplets, and contact the reaction vapor with the mist within the heated space of the reaction vessel.

The conversion of the impure seed substance to a mist of fine droplets can be effected within the reaction vessel by means of a plasma burner fed, for example, with hydrogen and argon or other noble gas, or by means of an electrical arc device.

According to another feature of the invention, the vaporous reaction mixture is supplied at one end of an elongated reaction vessel, and the impure seed material is dispersed into droplets at the same end. The excess amount or residue of the vaporous reaction gas mixture is taken from the other end of the reaction vessel and may be recycled back to the first-mentioned end of the vessel. The whiskers then grow in the heated reaction space from the substance precipitating out of the vaporous reaction mixture onto the individual droplets and can be continuously collected in a container located at the vessel end opposite the location of formation.

According to further features of the invention, the elongated reaction vessel is provided with a jacket-type heater for heating it to the temperature between the melting point of the impurity-containing droplet material and the melting temperature of the pure material of the whiskers to be grown. At the entering end of the reaction mixture there is provided a dispersing or atomizing device such as the above-mentioned plasma burner or arc device which produces the mist of liquid droplets from material supplied for example in form of a rod. The opposite end of the reaction vessel may be directly designed as a collecting container for the continuously resulting whiskers. Also located at the first-mentioned end of the reaction vessel is a device for supplying the vaporous reaction mixture which contains chemically bound whisker material, preferably together with hydrogen or other reactive or diluent gas. The residue that does not participate in the reaction issues from an outlet at the opposite end of the reaction vessel. For economy it is further advisable to provide a connecting conduit between the inlet and outlet of the reaction vessel so that the reaction mixture is continuously recirculated, aside from being continuously replenished in a controlled manner.

The invention takes advantage of the phenomenon that a vaporous substance will condense at droplets of crystallographically the same or similar material acting as liquid condensation nuclei. While generally the substance thus condensed is likewise liquid so that solid filaments or whiskers cannot normally be produced in this manner, the invention resorts to an artifice to nevertheless achieve that the material condensing at the droplets will be solid. This is why the invention requires using condensation nuclei of a more or less contaminated substance so that their melting point is lowered, whereas the condensing substance—by comparison—is pure because it is chemically or thermally liberated from a chemical compound. Since under such conditions the reaction vessel is kept at a temperature between the respective melting points of the contaminated substance and the relatively pure substance to be condensed, the pure substance, condensing at the liquid droplets, converts to the solid constitution of the whiskers.

The condensing substance does not grow randomly onto the droplets but rather prefers as point of origin any pure and solid particles already condensed at one or more points of a droplet. These starting localities of the growth are to be looked upon as constituting crystal seeds from which the monocrystals will grow in a manner comparable to the phenomenon observed with the known epitaxial process. This peculiar observation of singular starting points at minuscule droplets of a mist can be explained for example as follows. As a rule, monocrystals grow in a crystallographically favorable direction if all other conditions are the same on all sides of the crystal seed. Since the monocrystalline growth commences at a virtually pointlike crystal seed and the other conditions in the reaction vessel are everywhere the same, the crystal will grow as a filament or whisker.

The method is applicable to all substances satisfying the fundamental processing conditions. For example, whiskers can thus be produced from semiconductor materials such as silicon, germanium and boron, from metals such as iron, and from oxides, particularly metal oxides such as beryllium oxide. General rules for the selection of substances suitable for the method of the invention result from the following conditions:

a. In the first place, the method of the invention is applicable only to substances that can be liquefied under economically acceptable conditions. It is not feasible if no liquid droplets of the whisker material can be produced, as is the case with graphite, for example.

b. By method of the invention there can be produced whiskers of only such materials which form a chemical compound or reaction mixture whose boiling point is below the melting temperature of the pure substance, or which at least possesses such a high vapor pressure that the reaction gas mixture will entrain a sufficient amount of the whisker material. This condition is predicated upon the fact that the reaction gas mixture, containing the whisker material in chemically bound condition, is to be gaseous or vaporous in the same space of the reaction vessel and consequently at one and the same temperature at which the pure whisker material is solid.

c. Furthermore, the reaction gas mixture (or one of its components in which the whisker material is chemically bound) must be reducible or disproportionable at temperatures below the melting point of the pure whisker material. Only if this condition is met, will whisker material be liberated in the reaction space so that whiskers will be formed.

Generally the vaporous reaction gas mixture, containing the material for the whiskers, is supplied in form of a compound, for example a halogenide. Preferably used is a chloride or iodide mixed with hydrogen. In the heated reaction space of the vessel there occurs a disproportioning or reduction, for example a hydrogen reduction, of the reaction gas mixture so that solid atomic or molecular whisker material becomes segregated and precipitates predominantly at the droplets in the form of monocrystalline whiskers. Since at the reaction temperature the impure droplet material is maintained in liquid condition, it can act as a catalyst, for example, for the reduction of the above-mentioned halogenide, aside from serving as a crystal seed for whisker formation.

In most cases several whiskers of respectively different lengths and different diameters will grow on a single droplet of the mist. However, it also happens that only one whisker comes about at a single droplet. Only rarely has it been observed that droplets are located at both ends of a single whisker. The diameter of the whiskers made by the method according to the invention is in the range of about 0.1 to about 100 micron, and their length is between about 1 and 30 mm.

Figure 2:
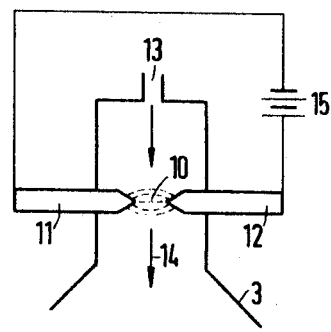

The method of the invention will be further elucidated by an example relating to the production of silicon whiskers and with reference to the accompanying drawing in which:

FIG. 1 shows schematically an apparatus for continuously producing whiskers; and FIG. 2 shows schematically an electric arcing device for dispersing the impure droplet material in production apparatus otherwise corresponding to FIG. 1.

In the apparatus shown in FIG. 1, the impure droplet material is supplied in form of a thin rod 1 consisting of silicon and having, for example, a diameter of 3 mm. Due to the impurity contained in the silicon, the melting point of the rod material is reduced 50 to 500° C. below the melting point of the pure silicon as it precipitates from the reaction gas used in the apparatus (1250 to 1420° C). For example, a rod 1 of contaminated silicon having a melting point at about 1000° C. is suitable. The rod 1 is passed into the reaction vessel 3 through a plasma burner 2 which operates to atomize the silicon into a mist of liquid droplets. The silicon mist enters into contact with the vaporous reaction mixture supplied into the reaction vessel 3 through a feeder device 5 to pass longitudinally through the vessel in the direction indicated by an arrow 7.

A heater jacket 4 maintains the interior of the reaction vessel at a temperature between 900 and 1100° C., this temperature being above the melting point of the impure silicon of rod 1 but below the melting temperature of pure silicon. The reaction gas mixture consists, for example, of about 6 percent by volume of silicon tetrachloride ($SiCl_4$), the remainder being hydrogen. This mixture, when heated to 900–1100° C., causes reduction of silicon tetrachloride by hydrogen and evolution of solid silicon. The reaction takes place predominantly at the droplets of the silicon mist so that the droplets continuously receive the precipitating silicon. The solid silicon then results in the growth of whiskers in the above-described manner. The rate of growth in the embodiment just described is in the order from millimeters to meters per second. The resulting whiskers drop in the direction of the arrow 7 into a collecting container 8 from which they can be taken from time to time. The remaining reaction gases leave the reaction vessel 3 through an outlet collector 7 and can be recycled—entirely or partly—into the reaction vessel through a line 9.

The method is analogously applicable for producing whiskers from metals and oxides. In this case, the semiconductor rod 1 is substituted by the greatly contaminated metal which is atomized into a mist of droplets within the reaction vessel, and the above-mentioned silicon tetrachloride or other semiconductor halogenide in the reaction gas mixture is substituted by a halogenide of the metal from which the whiskers are to be grown. For the production of oxide whiskers, the vaporous reaction gas mixture may consist, for example, of oxygen and the halogenide of the particular metal contained in the oxide.

In lieu of the plasma burner (2 in FIG. 1), the mist of liquid droplets serving as crystal seeds for the whisker production may be produced by some other dispersing or atomizing device such as the electrical arc device exemplified in FIG. 2. It will be understood that this device then substitutes the top portion of the vessel containing the plasma burner 2 and the rod 1 in FIG. 1. The arc 10 is maintained between electrode rods 11 and 12 supplied with current from a suitable source 15 (arc 10). In the illustrated example, hydrogen is supplied through an inlet opening 13 into the interior of the vessel in the direction indicated by an arrow 14. At the approximate locality of the arrow 14, the flow of hydrogen becomes laden with the droplets of the mist. These are produced by the arc 10 from the material of the electrode rods 11 and 12 consisting of the purposely impure metal or semiconductor material. An arc-type dispersing device as shown in FIG. 2 is well suitable for the production of metal whiskers or semiconductor whiskers.

Whiskers produced by the method of the invention are applicable, inter alia, for the production of composite or bonded materials together with a matrix of thermoplastic or metal, particularly aluminum, copper or magnesium, thus resulting in reinforced heterogeneous materials of improved mechanical, electrical or other physical properties.

I claim:

1. In the method of producing filamentary monocrystals by precipitation of crystal substance from a vaporous compound in a reaction vessel at elevated temperature, the improvement which comprises supplying the reaction space in the vessel with a mist of droplets of the same material serving as seed crystals to be produced, said droplet material serving as seed crystals for the monocrystals to be produced, adding impurity to the droplet forming substance for reducing its melting point 50° to 500° C. below that of the monocrystals to be produced; maintaining said reaction space at a temperature between the respective melting points of said droplet material and said monocrystals; contacting the vaporous compound in said reaction space with said mist of droplets, whereby filamentary monocrystals grow onto the droplets; said crystal substance being silicon and said droplet material being relatively impure silicon material, and said compound consisting of a halogenide of said semiconductor material and being mixed with hydrogen.

2. The method according to claim 1, which comprises supplying said droplet material in coherent constitution into the reaction vessel, and dispersing it inside the vessel to thereby form said mist of droplets in said reaction space.

3. The method according to claim 1, which comprises continuously supplying said droplet material in coherent constitution into the vessel and dispersing it inside the vessel into said mist of droplets, passing said vaporous compound in a continuous flow through said vessel from an inlet point near the dispersing locality of said droplet material so as to entrain the droplets and the filamentary monocrystals, and collecting the monocrystals at a vessel locality spaced in the entrainment direction from said dispersing locality.

4. The method according to claim 1, which comprises supplying said droplet material and said vaporous compound near the top of said vessel, and collecting the filamentary monocrystals at the bottom of said vessel.

5. The method according to claim 1, which comprises dispersing said droplet material inside said vessel by feeding it through a plasma burner.

6. The method according to claim 5, which comprises operating the plasma burner with a mixture of hydrogen and noble gas.